US012134078B2

(12) United States Patent
Guerriero

(10) Patent No.: US 12,134,078 B2
(45) Date of Patent: Nov. 5, 2024

(54) WINE AERATOR AND METHOD OF USING THE WINE AERATOR TO AERATE WINE

(71) Applicant: Francesco Guerriero, Boca Raton, FL (US)

(72) Inventor: Francesco Guerriero, Boca Raton, FL (US)

(73) Assignee: Donna Pascoe, Delray Beach, FL (US)

(*) Notice: Subject to any disclaimer, the term of this patent is extended or adjusted under 35 U.S.C. 154(b) by 519 days.

(21) Appl. No.: 17/245,227

(22) Filed: Apr. 30, 2021

(65) Prior Publication Data

US 2022/0347634 A1    Nov. 3, 2022

(51) Int. Cl.
*B01F 23/2361* (2022.01)
*C12G 1/00* (2019.01)
(Continued)

(52) U.S. Cl.
CPC ............ *B01F 23/2361* (2022.01); *C12G 1/00* (2013.01); *B01F 23/237611* (2022.01); *B01F 2101/17* (2022.01)

(58) Field of Classification Search
CPC .............. B01F 23/2361; B01F 2101/17; B01F 23/237611; C12G 1/00
(Continued)

(56) References Cited

U.S. PATENT DOCUMENTS

D535,559 S    1/2007 Kehoe
D623,010 S    9/2010 Higgins
(Continued)

FOREIGN PATENT DOCUMENTS

EM    001397772    1/2014
WO    2011/141773   11/2011

OTHER PUBLICATIONS

Ho, Wine Aerators Can Maximize the Flavor of Your Wine Twofold; Sep. 30, 2012 accessed at https://www.trendhunter.com/trends/wine-aerator.*
(Continued)

*Primary Examiner* — Donald R Spamer
*Assistant Examiner* — Philip A Dubois
(74) *Attorney, Agent, or Firm* — Jeffrey S. Melcher; Melcher Patent Law PLLC

(57) ABSTRACT

A wine aerator for expediting the breathing of wine just before serving having a main body 4 in a barrel shape with a flat bottom 20 and a flat top 22, the main body 4 defining a wine aeration chamber 24 where wine mixes with air to aerate the wine, a wine exit tube 6 connected to the wine aeration chamber 24 and extending substantially straight from the flat top 22, the wine exit tube 6 having an exit tube central axis and lying in an wine exit tube plane 34, an exit tube cork 16 is configured to seal the wine exit tube 6 configured to be inserted into and seal the exit tube 6, a wine inlet tube 8 connected to the aeration chamber and extending from a side of the main body 4, the inlet tube 8 is substantially perpendicular to the exit tube 6, a right elbow tube 10 having a first end and a second end, a first opening is connected to the wine inlet tube 8, the right elbow tube 10 bends at 90 degrees, a wine bottle tube 12 connected to the second opening of the right elbow tube 10, the wine bottle tube 12 having a wine bottle tube central axis 35, and the wine inlet tube 8, the right elbow tube 10, the wine bottle tube 12 and the wine bottle tube central axis 35 lying in a wine bottle tube plane, wherein the exit tube plane 34 is perpendicular to the wine bottle tube plane 36; and a wine bottle connector 14 configured to connect a wine bottle opening 32 to the wine bottle tube 12. A method of aerating wine using the wine aerator.

9 Claims, 8 Drawing Sheets

(51) Int. Cl.
*B01F 23/237* (2022.01)
*B01F 101/17* (2022.01)

(58) Field of Classification Search
USPC .......................................................... 426/474
See application file for complete search history.

(56) References Cited

U.S. PATENT DOCUMENTS

| | | |
|---|---|---|
| D631,291 S | 1/2011 | Kushner |
| D663,593 S | 7/2012 | Huynh |
| D710,649 S | 8/2014 | Kihl |
| D838,541 S | 1/2019 | Carter |

OTHER PUBLICATIONS

Vino Does Aerator/Dispenser, accessed at https://www.winestuff.com/products/vino-dose-aerator-dispenser, Sep. 23, 2020 (Winestuff) (Year: 2020).*
Wine Aerator Patentability Search Report, Mar. 31, 2021, pp. 1-10.
"Grapevine in-bottle Wine Aerator" www.petagadget.com/gadget/grapevien-in-bottle-wine-aerator-29, (Accessed Mar. 29, 2021) pp. 1-6.
Ho, "Grapevine-Shaped Aerators", www.trendhunter.com/trends/wine-aerator, Sep. 30, 2012, pp. 1-6.
"Bordeaux Wine Aerator & Decanter" LSArts, (Accessed Mar. 29, 2021) p. 1.

* cited by examiner

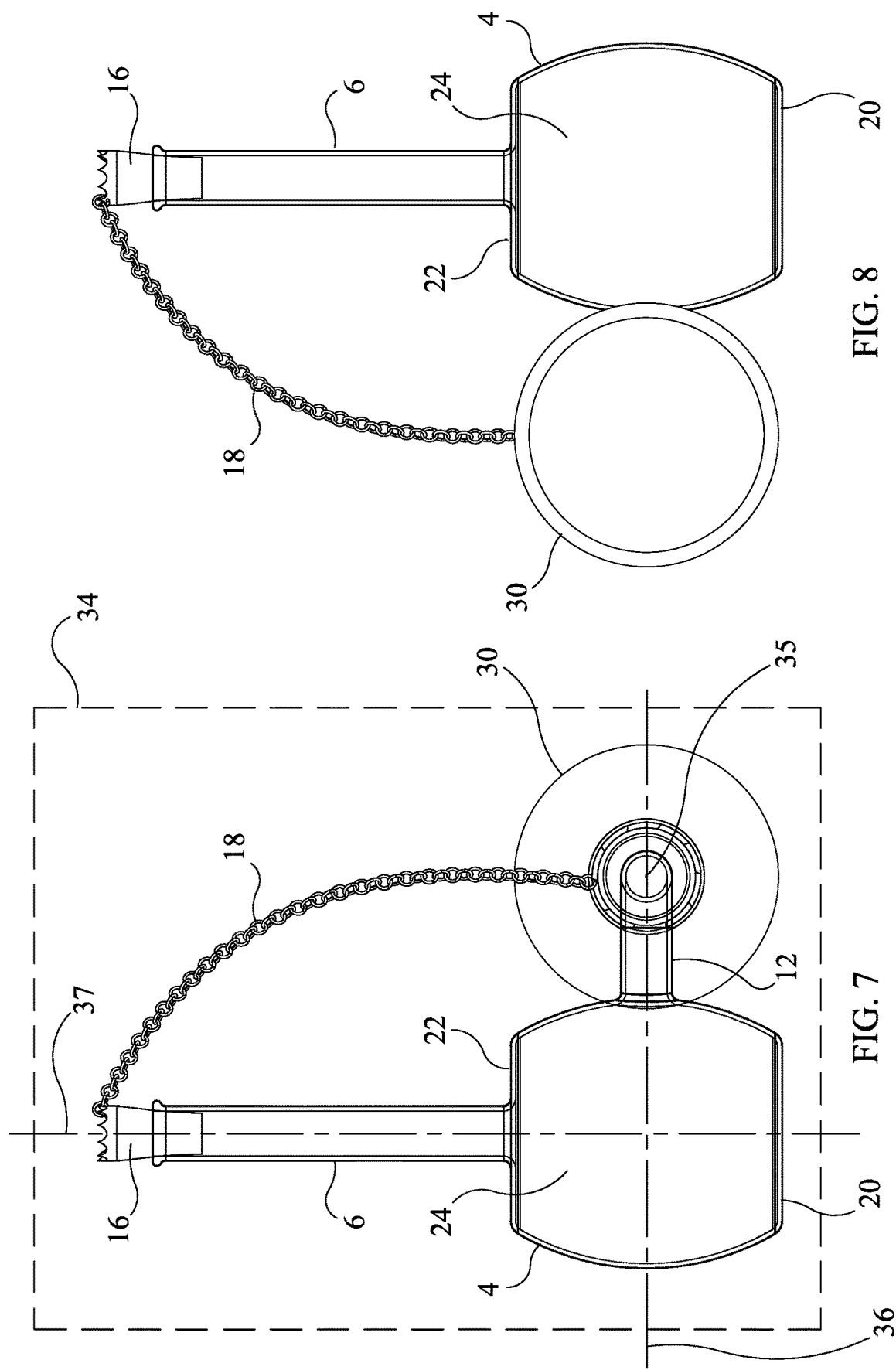

WINE AERATOR AND METHOD OF USING THE WINE AERATOR TO AERATE WINE

FIELD OF THE INVENTION

The invention generally relates to a wine aerator and a method of using the wine aerator to aerate wine.

BACKGROUND OF THE INVENTION

Wine connoisseurs know that to enjoy the bouquet and flavor of a fine wine, the wine should be allowed to breathe. Heretofore, this has been done by opening a bottle of wine and allowing it to interact with the atmosphere in order to oxidize certain chemicals, such as tannins, naturally contained in wine, which would otherwise impair the taste of the wine.

To expedite the breathing wine, wine aerators have been utilized. Examples of wine aerators include those disclosed in U.S. Pat. Nos. 9,463,423; 8,727,324; 5,713,263; and 4,494,452. The disclosed wine aerators are complex and sometimes difficult to use. There is a need for simplified aerator that easy to use.

SUMMARY OF THE INVENTION

An objective of the invention is to provide an improved wine aerator.

The objectives of the invention and other objectives can be obtained by a wine aerator for expediting the breathing of wine just before serving comprising:
  a main body 4 formed from glass or a clear food grade plastic having a barrel shape with a flat bottom 20 and a flat top 22, the main body 4 defining a wine aeration chamber 24 where wine mixes with air to aerate the wine;
  a wine exit tube 6 connected to the wine aeration chamber 24 and extending substantially straight from the flat top 22, the wine exit tube 6 having an exit tube central axis and lying in an wine exit tube plane 34;
  an exit tube cork 16 is configured to seal the wine exit tube 6 configured to be inserted into and seal the exit tube 6;
  a wine inlet tube 8 connected to the aeration chamber and extending from a side of the main body 4, the inlet tube 8 is substantially perpendicular to the exit tube 6;
  a right elbow tube 10 having a first end and a second end, a first opening is connected to the wine inlet tube 8, the right elbow tube 10 bends at 90 degrees;
  a wine bottle tube 12 connected to the second opening of the right elbow tube 10, the wine bottle tube 12 having a wine bottle tube central axis 35, and the wine inlet tube 8, the right elbow tube 10, the wine bottle tube 12 and the wine bottle tube central axis 35 lying in a wine bottle tube plane, wherein the exit tube plane 34 is perpendicular to the wine bottle tube plane 36; and
  a wine bottle connector 14 configured to connect a wine bottle opening 32 to the wine bottle tube 12.

Objectives of the invention can also be obtained by a method aerating wine using the wine aerator, comprising:
  connecting the wine bottle tube 12 to a wine bottle opening 32 using the wine bottle connector 14;
  poured wine from the wine bottle 30 by raising the wine bottle 30 above the main body 4 by rotating the wine bottle 30 about the exit tube central axis 37 so that wine flows from the wine bottle 30 through the wine bottle tube 12, right elbow tube 10, the wine inlet tube 8 and then into the aeration chamber 24;
  aerating the wine in the aeration chamber 24 to form aerated wine; and
  pouring the aerated wine from the aeration chamber 24 by rotating the wine bottle 30 about the wine bottle tube central axis 35.

BRIEF DESCRIPTION OF THE DRAWINGS

FIG. 7 illustrates a front view of the wine aerator connected to a bottle of wine.

FIG. 8 illustrates a back view of the wine aerator connected to a bottle of wine.

DETAILED DESCRIPTION OF THE INVENTION

Figure 1:
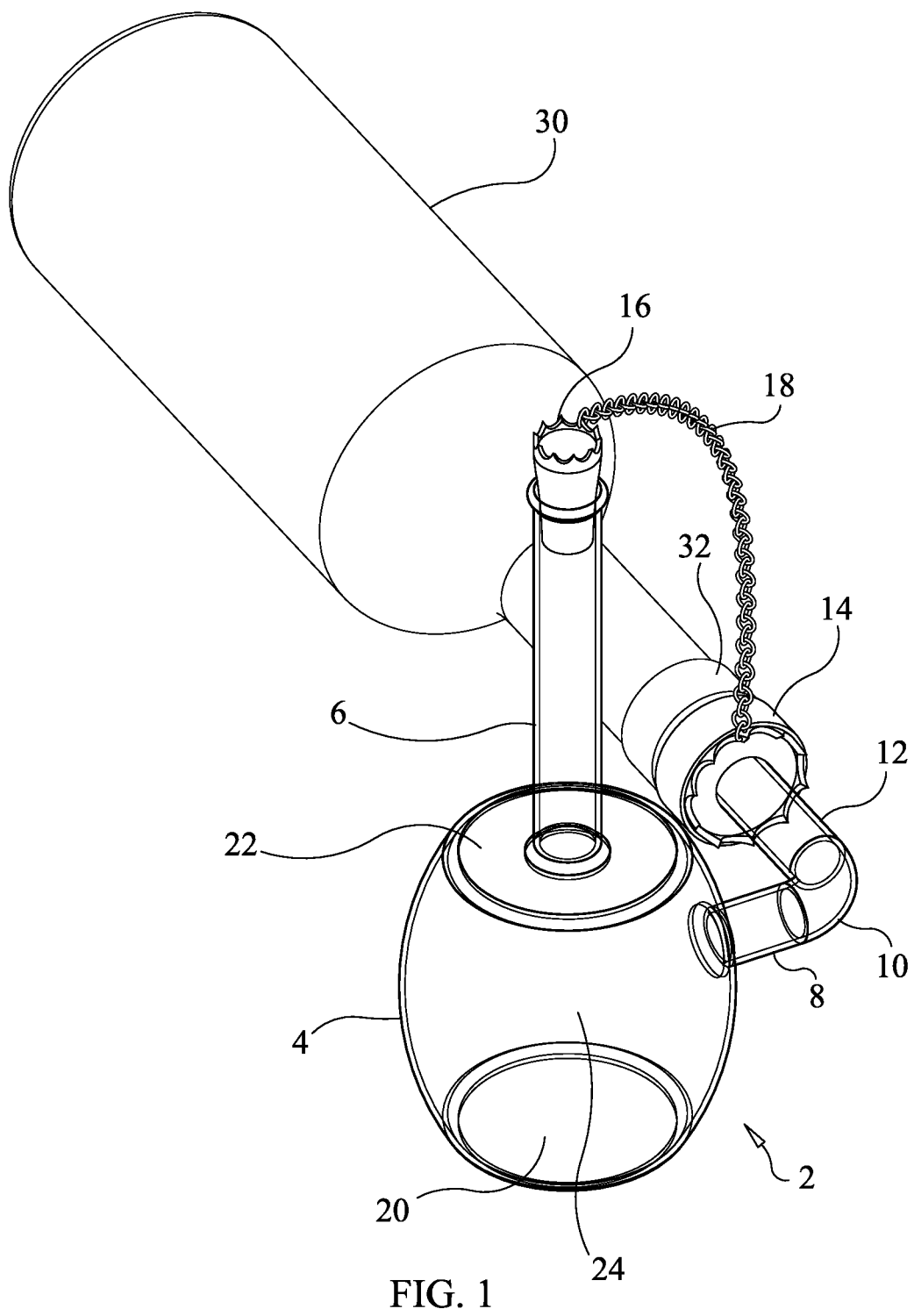
FIG. 1 illustrates a perspective view of the wine aerator connected to a bottle of wine.
Figure 2:
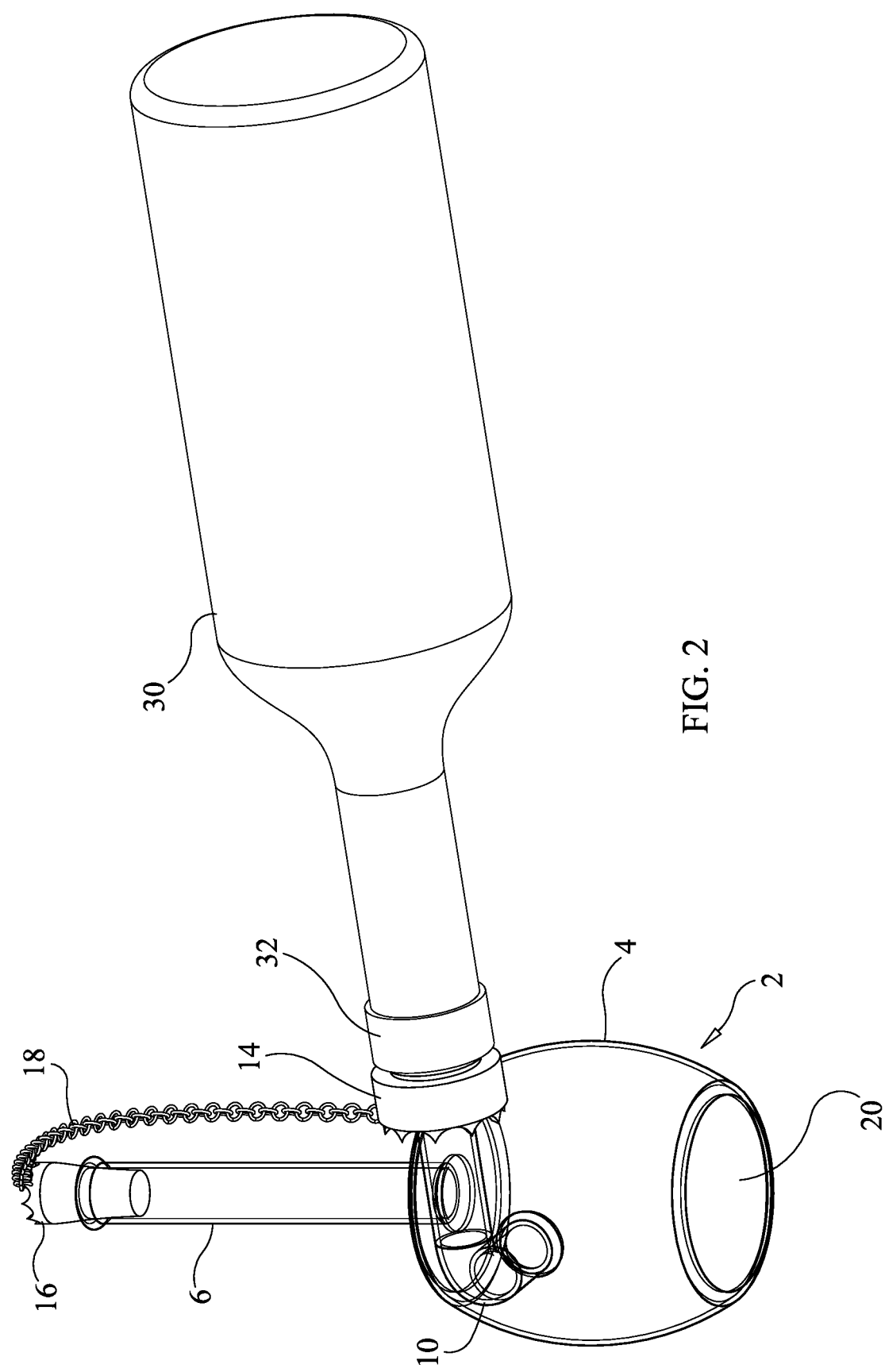
FIG. 2 illustrates a perspective view of the wine aerator connected to a bottle of wine.
Figure 3:
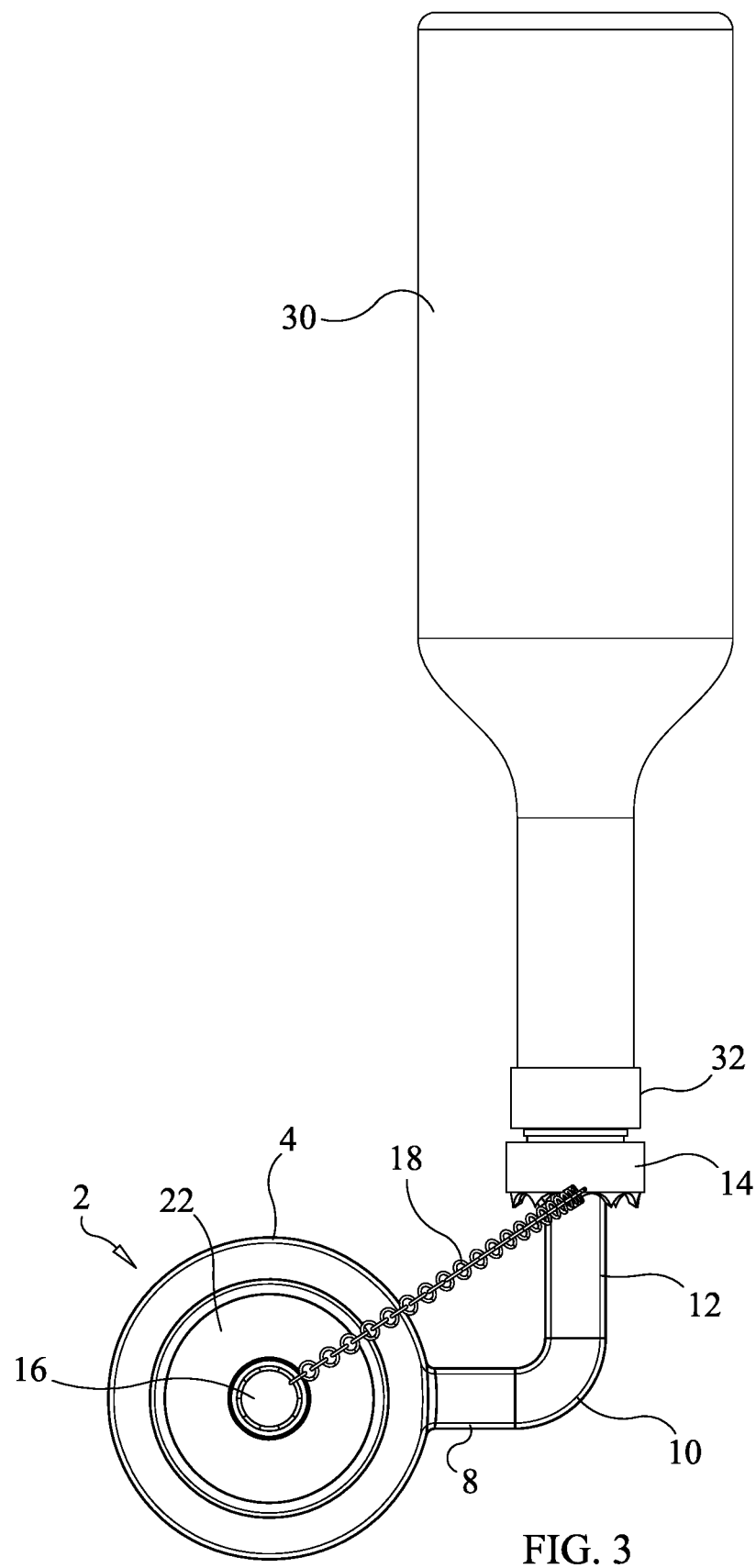
FIG. 3 illustrates a top view of the wine aerator connected to a bottle of wine.
Figure 4:
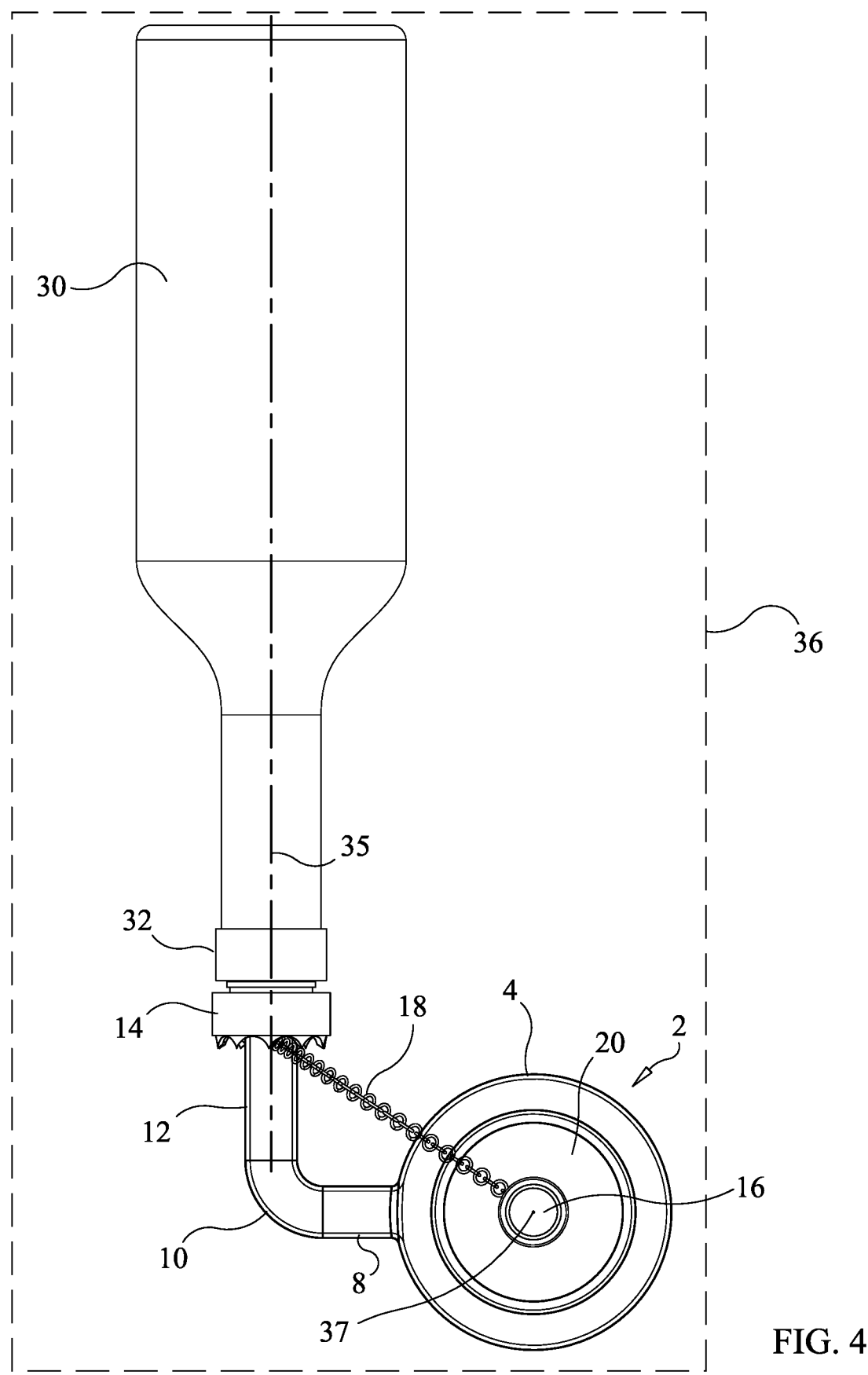
FIG. 4 illustrates a bottom view of the wine aerator connected to a bottle of wine.
Figure 5:
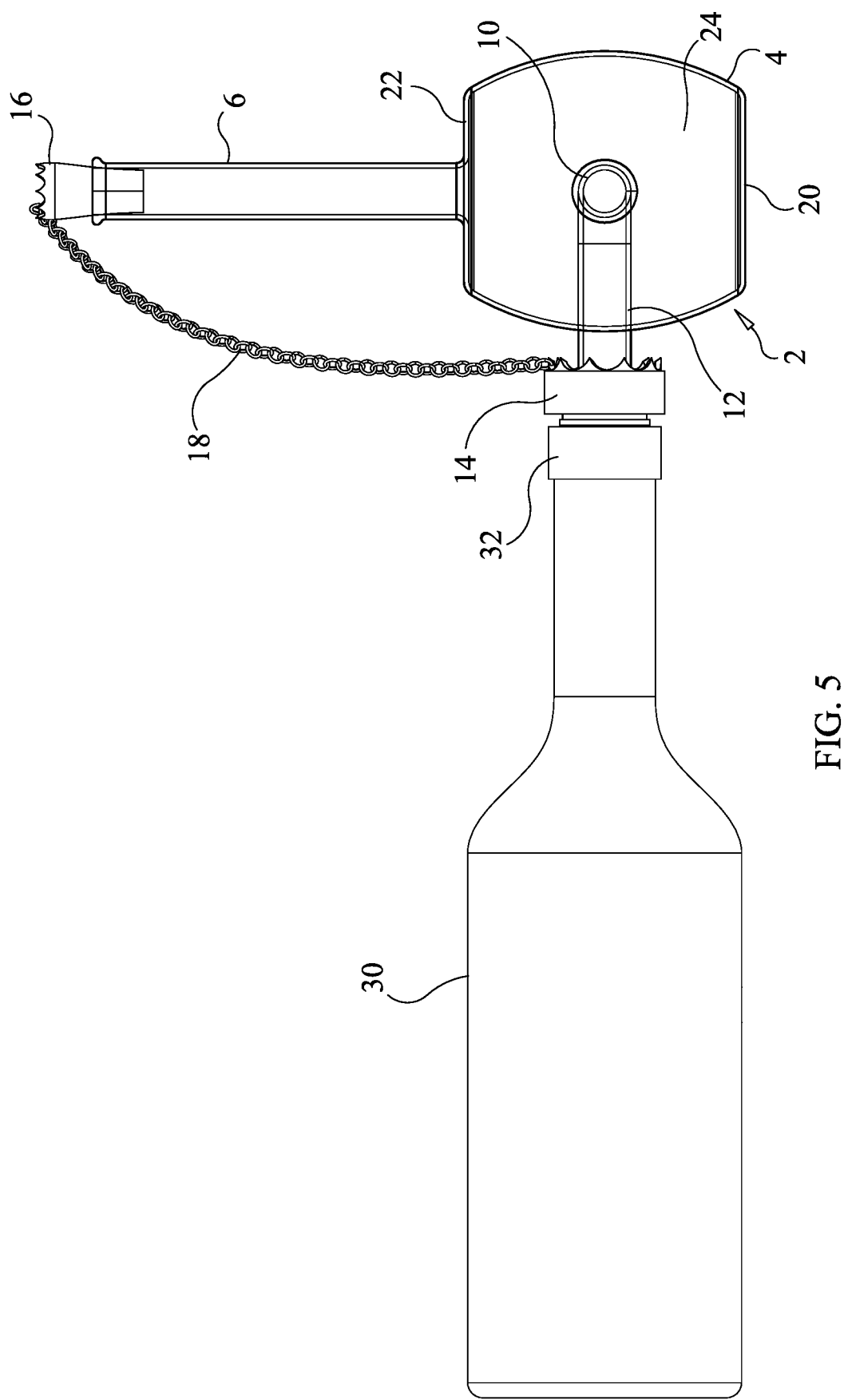
FIG. 5 illustrates a side view of the wine aerator connected to a bottle of wine.
Figure 6:
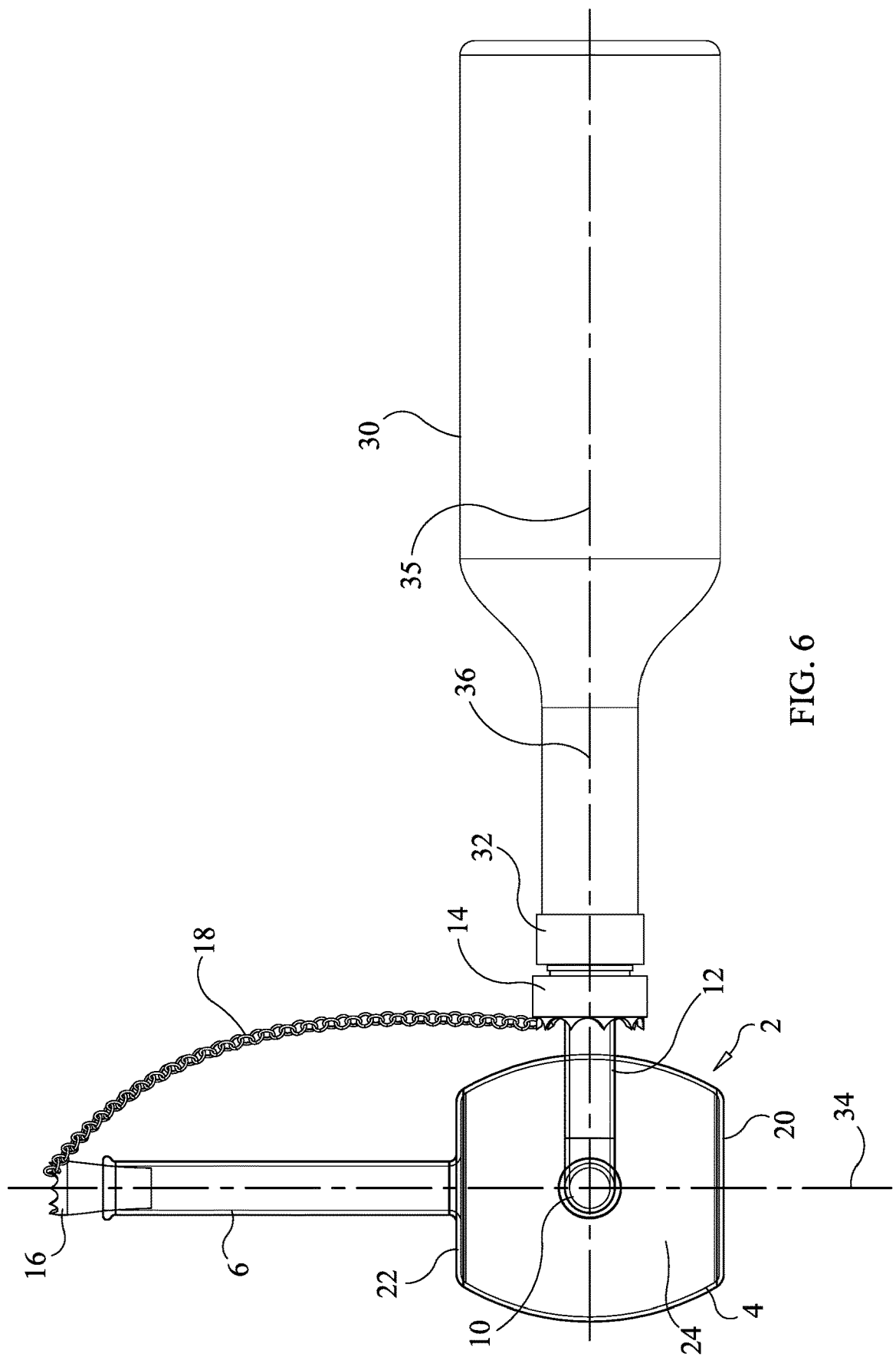
FIG. 6 illustrates a side view of the wine aerator connected to a bottle of wine.
Figure 9:
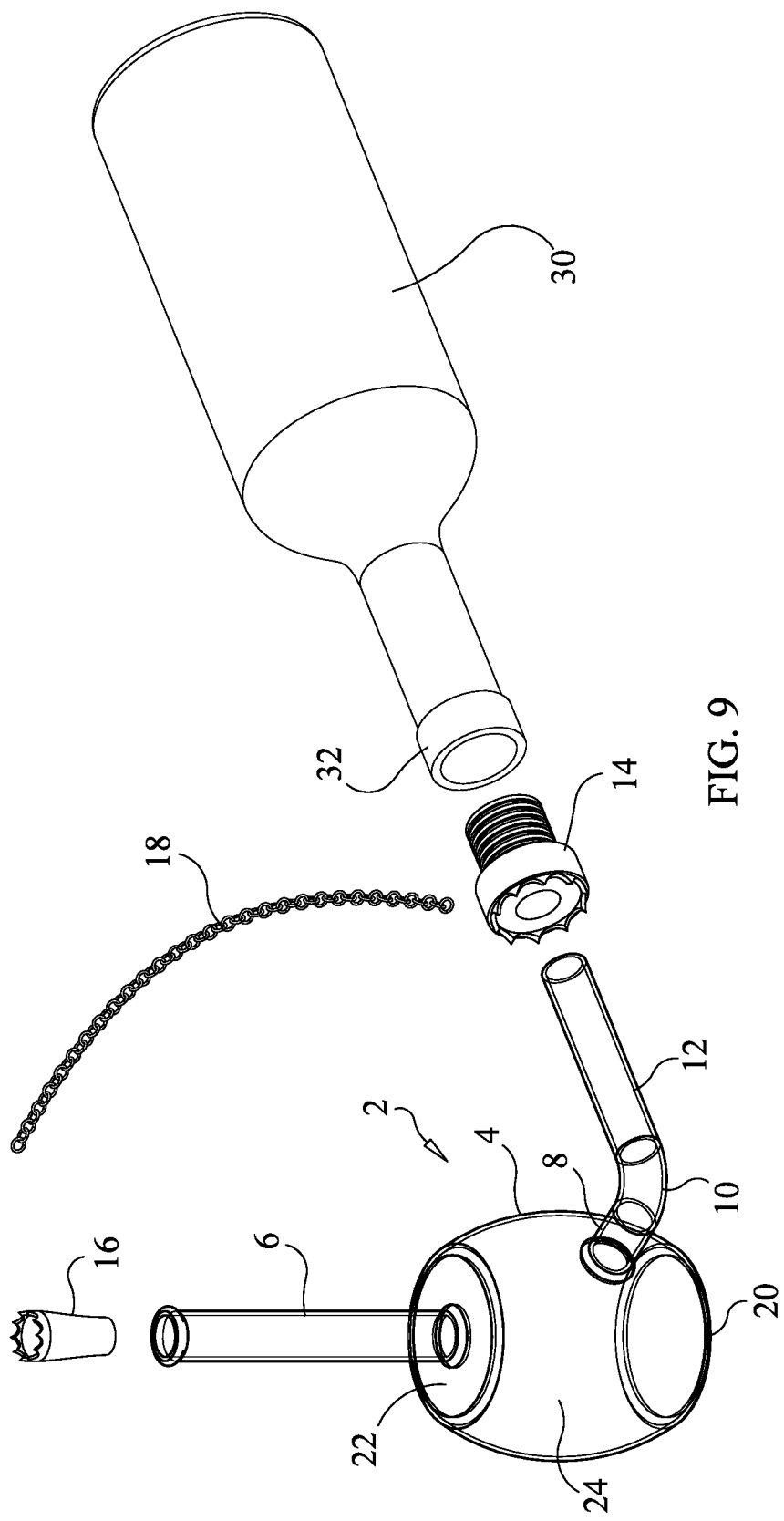
FIG. 9 illustrates an exploded view of the parts of wine aerator and bottle of wine.

The present invention will be explained with reference to the attached non-limiting figures.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

The wine aerator 2 comprises a main body 4 formed from glass or a food grade clear plastic. The preferred material is glass. The main body 4 has a barrel shape with a flat top 22 and a flat bottom 20. The main body 4 defines a wine aeration chamber 24 where wine mixes with air to aerate the wine. A wine exit tube 6 exist substantially straight from the flat top 22. An exit tube cork 16 is configured to seal the wine exit tube 6 when inserted into the exit tube 6. A wine inlet tube 8 enters a side of the main body 4 and is substantially perpendicular to the exit tube 6. A right elbow tube 10 is connected to the wine inlet tube 8. The right elbow tube 10 bends at 90 degrees. The right elbow tube 10 is connected to a wine bottle tube 12. A wine bottle connector 14 connects a wine bottle opening 32 to the wine bottle tube 12. A flexible connector connects the exit tube cork 16 to the wine bottle connector 14.

The wine exit tube 6 lies in an exit tube plane 34. The wine inlet tube 8, right elbow tube 10, wine bottle tube 12 and a wine bottle tube central axis 35 lie in a wine bottle tube plane 36. The exit tube plane 34 is perpendicular to the wine bottle tube plane 36. The exit tube 6 has an exit tube central axis 37. The exit tube central axis 37 of the wine bottle tube 12 is perpendicular to the wine bottle tube central axis 35. The exit tube central axis 37 lies in the exit tube plane 34. The wine bottle tube central axis 35 lies in the wine bottle tube plane 36.

During use, the wine bottle tube 12 is connected to the wine bottle opening 32 using the wine bottle connector 14. Wine can be first be poured from the wine bottle 30 by raising the wine bottle 30 above the main body 4 by rotating the wine bottle 30 about the exit tube central axis 37 so that wine flows from the wine bottle 30 through the wine bottle tube 12, right elbow tube 10, the wine inlet tube 8 and then into the aeration chamber 24. In the aeration chamber 24, the wine will mix with air to form aerated wine. To pour the aerated wine from the aeration chamber 24, the wine bottle 30 is rotated about the wine bottle tube central axis 35. The aeration chamber 24 can be sealed by inserting the exit tube cork 16 into the exit tube 6.

The flat bottom 20 prevents the wine bottle 30 and wine aerator 2 from rotating when set down on a table.

The main body 4 preferably has a size so that the aeration chamber 24 can contain at least one glass of wine. Examples of suitable sizes of the aeration chamber 24 are from 100 to 200 ml, preferably from 140 to 180 ml, more preferably from 150 to 160 ml.

The length of the exit tube 6 can be as desired. Examples of suitable lengths of the exit tube 6 are from 2 to 20 cm, more preferable from 4 to 16 cm. The length of the inlet tube 8 can be as desired. Examples of suitable lengths of the inlet tube 8 are from 1 to 10 cm, more preferable from 1 to 6 cm. The length of the wine bottle tube 12 can be as desired. Examples of suitable lengths of the wine bottle tube 12 are from 5 to 25 cm, more preferable from 5 to 20 cm. The inner diameter of the tubes can be as desired. Examples of suitable inner diameters are from 0.1 to 2 cm, preferably 0.2 to 1 cm.

REFERENCE NUMBERS

2 Wine aerator
4 Main body
6 Exit tube
8 Inlet tube
10 Elbow on inlet tube
12 Wine bottle tube
14 Wine bottle connector to wine bottle tube
16 Exit tube cork
18 Flexible connector connecting exit tube cork to wine bottle connector
20 Flat bottom of main body
22 Flat top of main body
24 Wine aeration chamber in main body
30 Wine bottle
32 Opening of wine bottle
34 Plane of exit tube
35 Central axis of wine bottle tube
36 Plane of wine bottle tube
37 Central axis of exit tube It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention. While the invention has been described to provide an access hole over a buried utility, the invention can be utilized wherever an access hole in the roadway is required.

The invention claimed is:

1. A method aerating wine comprising:
providing a wine aerator for expediting the breathing of wine just before serving comprising:
a main body formed from glass or a clear food grade plastic defining a wine aeration chamber where wine mixes with air to aerate the wine;
a wine exit tube connected to the wine aeration chamber and extending substantially straight from a top of the main body, the wine exit tube having an exit tube central axis and lying in a wine exit tube plane;
an exit tube cork is configured to seal the wine exit tube configured to be inserted into and seal the exit tube;
a wine inlet tube connected to the aeration chamber and extending from a side of the main body, the inlet tube is substantially perpendicular to the exit tube;
a right elbow tube having a first end and a second end, a first opening is connected to the wine inlet tube, the right elbow tube bends at 90 degrees;
a wine bottle tube connected to the second opening of the right elbow tube, the wine bottle tube having a wine bottle tube central axis, and the wine inlet tube, the right elbow tube, the wine bottle tube and the wine bottle tube central axis lying in a wine bottle tube plane, wherein the exit tube plane is perpendicular to the wine bottle tube plane; and
a wine bottle connector configured to connect a wine bottle opening to the wine bottle tube;
connecting the wine bottle tube to a wine bottle opening using the wine bottle connector;
poured wine from the wine bottle by raising the wine bottle above the main body by rotating the wine bottle about the exit tube central axis so that wine flows from the wine bottle through the wine bottle tube, right elbow tube, the wine inlet tube and then into the aeration chamber;

aerating the wine in the aeration chamber to form aerated wine; and pouring the aerated wine from the aeration chamber by rotating the wine bottle about the wine bottle tube central axis.

2. The method according to claim 1, further comprising inserting an exit tube cork into the exit tube to seal the aeration chamber after pouring the wine.

3. The method according to claim 1, wherein the main chamber having a flat bottom.

4. The method according to claim 1, wherein the main chamber having a barrel shape with a flat bottom and a flat top.

5. The method according to claim 1, further comprising a flexible connector connecting the exit tube cork to the wine bottle connector.

6. The method according to claim 1, wherein the aeration chamber is 100 to 200 ml.

7. The method according to claim 6, wherein a length of the exit tube is from 2 to 20 cm, a length of the inlet tube is from 1 to 10 cm, a length of the wine bottle tube is from 5 to 25 cm, and an inner diameter of the exit tube, inlet tube, and wine bottle tube is from 0.1 to 2 cm.

8. The method according to claim 6, wherein a length of the exit tube is from 4 to 16 cm, a length of the inlet tube is from 1 to 6 cm, a length of the wine bottle tube is from 5 to 20 cm, and an inner diameter of the exit tube, inlet tube, and wine bottle tube is from 0.2 to 1 cm.

9. The method according to claim 1, wherein the aeration chamber is from 150 to 160 ml.

\* \* \* \* \*